United States Patent [19]

Wang et al.

[11] Patent Number: 5,999,032

[45] Date of Patent: Dec. 7, 1999

[54] MULTIPLE PHASE SYNCHRONOUS RACE DELAY CLOCK DISTRIBUTION CIRCUIT WITH SKEW COMPENSATION

[75] Inventors: Gyh-Bin Wang, Chung-Li; Li-Chin Tien, Taipei, both of Taiwan

[73] Assignee: Etron Technology, Inc., Hsin-Chu, Taiwan

[21] Appl. No.: 09/035,053

[22] Filed: Mar. 5, 1998

[51] Int. Cl.⁶ .............................. H03K 5/14; H03L 7/00
[52] U.S. Cl. ......................... 327/292; 327/295; 327/161; 327/258; 327/261
[58] Field of Search .................................. 327/141, 154, 327/161, 158, 258, 259, 256, 257, 254, 255, 261, 263, 269, 271, 284, 291, 292, 293, 295, 299; 375/373

[56] References Cited

U.S. PATENT DOCUMENTS

| | | | |
|---|---|---|---|
| 5,313,501 | 5/1994 | Thacker | 327/292 |
| 5,489,864 | 2/1996 | Ashuri | 327/161 |
| 5,663,767 | 9/1997 | Rumreich et al. | 348/537 |
| 5,901,190 | 5/1999 | Lee | 327/158 |

OTHER PUBLICATIONS

T. Saeki et al. "A 2.5ns Clock Access 250Mhz, 256Mb SDRAM with Synchronous Mirror Delay", IEEE Journal of Solid State Circuits, vol. 31, No. 11, Nov. 1996, pp. 1656–1664.

T. Yamad et al. "Capacitive Coupled Bus with Negative Delay Circuit for High Speed and Low Power (10GB)s<500mw) Synchronous DRAM)" Digest of Papers for IEEE Symposium on VLSI Circuits, 1996, pp. 112–113.

*Primary Examiner*—Timothy P. Callahan
*Assistant Examiner*—Eunja Shin
*Attorney, Agent, or Firm*—George O. Saile; Stephen B. Ackerman; Billy Knowles

[57] ABSTRACT

A dual phase synchronous race delay clock circuit that will create an internal clock signal in an integrated circuit that is synchronized with and has minimum skew from an external system clock signal is disclosed. The synchronous race delay circuit has an input buffer circuit to receive, buffer, and amplify an external clock signal. The input buffer circuit has a delay time that is the first delay time. A fast pulse generator is connected to the input buffer circuit to create a fast pulse signal. The fast pulse generator is connected to a slow pulse generator to create a slow pulse signal. The fast pulse generator and the slow pulse generator is connected to a race delay measurement means to determine a measurement of a period of the external system clock by comparing a time difference between the slow pulse signal and a following fast pulse signal. A delay control means is connected to the race delay measurement means to receive the measurement of the period of the external system clock. The delay control means will create a first phase control pulse and a second phase control pulse. A duty cycle synchronizer means is connected to the delay control means to create the dual phases of the internal clock from the first phase control pulse and the second phase control pulse. An internal buffer will buffer and amplify the two phases of the internal clock signal that is aligned with the external clock signal to have minimum skew.

4 Claims, 8 Drawing Sheets

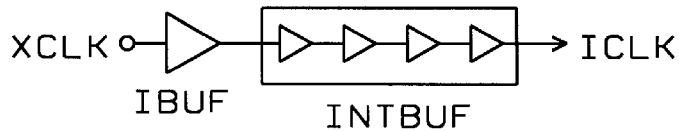
FIG. 1a – Prior Art
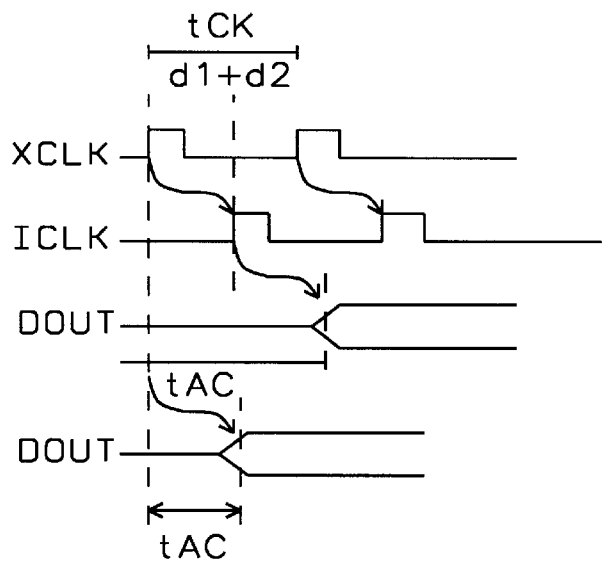
FIG. 1b – Prior Art
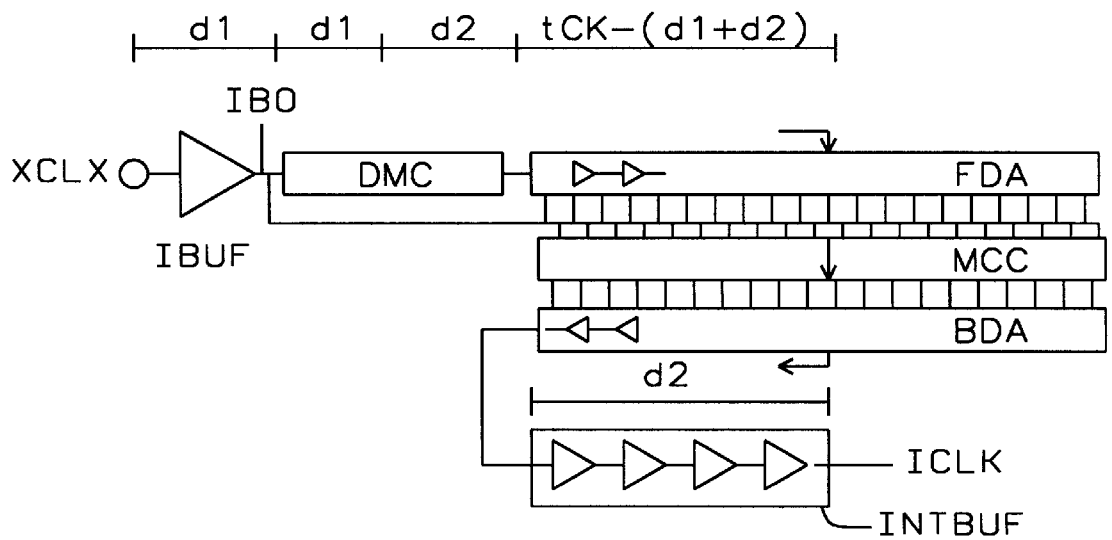
FIG. 2a – Prior Art

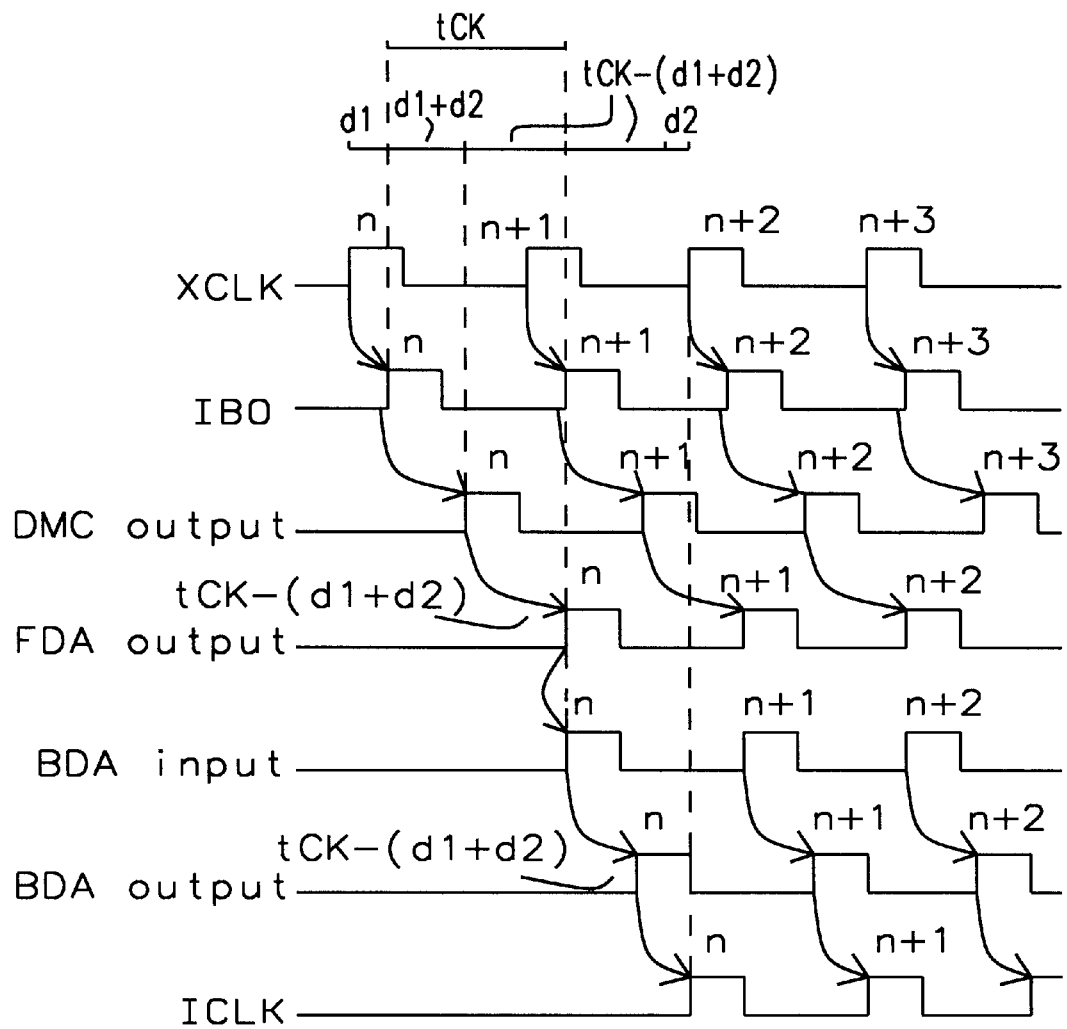
FIG. 2b - Prior Art

MULTIPLE PHASE SYNCHRONOUS RACE DELAY CLOCK DISTRIBUTION CIRCUIT WITH SKEW COMPENSATION

RELATED PATENT APPLICATIONS

A Latched-Type Clock Synchronizer With Additional 180°-Phase Shift Clock, Ser. No. 09/040,435, Filing Date: Mar. 18, 1998, Assigned to the Same Assignee as the present invention.

BACKGROUND OF THE INVENTION

1. Field Of The Invention

This invention relates to circuitry for the distribution of clock timing signals within integrated circuits that must provide multiple clock phases with minimal skew in relation to an external system clock.

2. Description of Related Art

The structure and timing of the clock distribution within an integrated circuit such as an Synchronous Dynamic Random Access Memory (SRAM) is described in "A 2.5 ns Clock Access 250 Mhz, 256 Mb SDRAM with Synchronous Mirror Delay" by T. Saeki et al, IEEE Journal of Solid State Circuits, Vol 31 No. 11 November 1996, pp 1656–1664, and shown in FIGS. 1a and 1b. The system clock XCLK is received by the input buffer IBUF. The input buffer IBUF has a delay time from the input of the system clock XCLK to the output of the input buffer IBUF that is designated d1. The output of the input buffer IBUF is the input to multiple internal buffers INTBUF. The internal buffers INTBUF will then transfer the internal clock ICLK to the functional units within the integrated circuit chip. The delay time for the internal buffer INTBUF is designated d2.

The internal clock ICLK will be the timing signal that is used to synchronize the transfer of the digital data from the internal circuits of an integrated circuit chip to the data input/output buffers and to the data bus of the integrated circuit chip. The internal clock ICLK will be delayed or skewed by the delay d1 of the input buffer IBUF plus the internal buffer INTBUF. Since the timing of the functions of integrated circuits such as a SDRAM are determined by the internal clock ICLK, the access time $T_{acc}$ of the fetching or reading of the digital data from an SDRAM can be no smaller than the clock skew d1+d2. As computer system clocks are approaching transfer rates of 100 Mhz, it is desirable that the access time $T_{acc}$ of an SDRAM to be brought to ±1 ns of the period of the system clock XCLK. This means that the clock skew must be eliminated from the clock distribution system.

Phase Locked Loops (PLL) and Delay Locked Loops (DLL) are well known in the art for synchronizing two timing signals. In both cases the time to achieve synchronization or lock may be on the order of 50 cycles or more. With such long lock times in SDRAM applications, the internal clocking signals ICLK can not be deactivated during the periods that the SDRAM is inactive. This will increase the power dissipation of the SDRAM to undesirable levels.

The Clock Synchronization Delay (CSD) is a class of synchronizing circuits that will eliminate the clock skew d1+d2 within two clock cycles. Two types of CSD's known in the art are the latch type CSD and the nonlatched synchronous mirror delay SMD.

FIGS. 2a and 2b show a schematic diagram and a timing diagram for the general structure of a CSD circuit. As in FIG. 1a, the system clock XCLK is received by the input buffer IBUF. The output IBO of the input buffer IBUF is delayed by the delay d1. The output IBO of the input buffer IBUF is the input to the delay monitor circuit DMC. The delay monitor circuit DMC will provide an output that is a delayed input signal IBO by a fixed amount that is usually the sum of the delay d1 of the input buffer IBUF and the delay d2 of the internal buffer INTBUF.

The output of the delay monitor circuit DMC will be the input of the forward delay array FDA. The forward delay array FDA comprises a number of delay elements that will each delay the input of the forward delay array FDA by an increment of time $t_{df}$. The output of each delay element of the forward delay array FDA is the input for each subsequent delay element and is also one of the multiple outputs of the forward delay array FDA.

The multiple outputs of the forward delay array FDA are inputs to the mirror control circuit MCC. The output IBO of the input buffer circuit IBUF is also provided to multiple inputs of the mirror control circuit MCC. The output IBO of the input buffer circuit IBUF is compared with each output of the forward delay array FDA. When one of the outputs of the forward delay array FDA is aligned with the n+1 pulse of the output IBO of the input buffer IBUF, the mirror control circuit will transfer that one output to the backward delay, array BDA. The mirror control circuit MCC will have multiple outputs to transfer any one of the inputs of the mirror control circuit MCC from the forward delay array FDA to the backward delay array BDA. The backward delay array BDA is comprised of multiple delay elements. Each delays element has a delay time $t_{df}$ equal to the delay time of the forward delay array FDA.

The delayed clock pulse will be delayed by a factor of:

$$\tau_{FDA} = \tau_{ck} - (d_1 + d_2)$$

where:

$\tau_{ck}$ is the time of the period of the external clock.

$\tau_{FDA}$ is the time of the period of the external clock less the skew $d_1+d_2$.

The delayed clock pulse will be further delayed by the factor $\tau_{FDA}$ in the backward delay array BDA. thus the nth pulse output of the backward delay array BDA will be delayed by a factor of $$2d_1 + d_2 + 2[\tau_{ck} - (d_1 + d_2)]$$

This will make the nth pulse of the backward delay array BDA misaligned with the n+2 pulse of the system clock XCLK by a factor of the delay $d_2$ of the internal buffer INTBUF.

The output of the backward delay array BDA will be the input of the internal buffer INTBUF. The nth internal clock ICLK will now be aligned with the system clock XCLK.

The mirror control circuit MCC will be of two types. The first type as described in "Capacitive Coupled Bus with Negative Delay Circuit for High Speed and Low Power (10 GB/s<500 mw) Synchronous DRAM)" by T. Yamada et al, Digest of Papers for IEEE Symposium on VLSI Circuits, 1996, pp 112–113, will be a latch that will fix the delay segment of the forward delay element FDA selected to be transferred to the backward delay array BDA. Once the latch is set, it will only be reset during the inactivity time of the SDRAM. Upon reactivation of the SDRAM, the decision of the length of the delay necessary will be recreated.

The second type of mirror control circuit MCC will be the synchronous mirror delay. The mirror control circuit MCC will be a pass gate that is activated when the output of the forward delay circuit FDA is aligned with the n+1 pulse of the output IBO of the input buffer circuit IBUF. The synchronous mirror delay will choose on each cycle of the system clock XCLK, which of the delay elements is satisfactory to align with the output IBO of the input buffer circuit IBUF.

As the system timing requirements of modern computers has increased, it is now necessary to double the frequency of transfer of data from SDRAM, that is to transfer data from the data bus to the system twice every clock cycle.

A new class of SDRAM is referred to as a Double Data Rate (DDR) SDRAM. The specification of the DDR SDRAM, as presently under discussion, does not specify that the system clock XCLK have a precise 50% duty cycle. However, it must have the first data present at the Data Input/Output Buffers at the beginning of a clock cycle, that is when the system clock XCLK rises from the first logic level (0) to the second logic level (1). The second data must be present at the Data Input/Output Buffers at the time that is one half of the period of the system clock $\tau_{ck}$ or to be 180° out of phase with the system clock XCLK.

This creates a requirement for a dual phase clock having a precise 50% duty cycle. The dual phase clock must be deskewed with respect to the system clock XCLK in the two cycles from the clock enable signal XCKE.

U.S. Pat. No. 5,663,767 (Rumreich et al.) describes a clock retiming apparatus for aligning a video clock edge with horizontal synchronization signal of a video signal by using latched outputs of delay lines. The outputs of the delay lines are selected according to their alignment with the horizontal synchronization signal.

U.S. Pat. No. 5,489,864 (Ashuri) discloses an integrated circuit for deskewing and adjusting a delay of a synthesized waveform. The synthesized waveform is initially produced by a digital-to-time domain converter which is coupled to a synchronous delay line and a pattern ROM though a shifter and pattern register. The synchronous delay line generates a plurality if taps in response to a reference signal. Each one of the taps has a unit delay and is coupled to the digital to time domain converter. The integrated circuit described comprises a microdelay calibration circuit, deskew control circuit, and a delay interpolation circuit. The microdelay calibration circuit is coupled to the synchronous delay line and the deskew control circuit. The deskew control circuit is further coupled to the shifter and the delay interpolation circuit. The delay interpolation circuit receives the output of the digital-to-time domain converter and outputs a deskewed synthesized waveform.

SUMMARY OF THE INVENTION

An object of this invention is to provide an internal clock circuit in an integrated circuit that will create an internal clock signal that is synchronized with and has minimum skew from an external system clock signal.

Another object of this invention is provide an internal clock circuit in an integrated circuit that will create an internal clock signal that has a precise duty cycle.

Further another object of this invention is to provide an internal clock circuit within an integrated circuit that will provide multiple clock signals with multiple phases and are synchronized to and have minimum skew from an external clock signal.

To accomplish these and other objects a synchronous race delay circuit has an input buffer circuit to receive buffer, and amplify an external clock signal. The input buffer circuit has a delay time that is designated the first delay time. A fast pulse generator is connected to the input buffer circuit to create a fast pulse signal that is delayed from the external clock by the first delay time. The fast pulse generator will determine the pulse width of the fast pulse signal. The fast pulse generator is connected to a slow pulse generator to create a slow pulse signal. The slow pulse signal will be a replica of the fast pulse signal that is delayed from the fast pulse signal by a time that is the sum of the first delay time and a second delay time.

The fast pulse generator and the slow pulse generator are connected to a race delay measurement means. The race delay measurement means will determine a measurement of a period of the external system clock. The measurement will be made by comparing a time difference between the slow pulse signal and a following fast pulse signal. The comparing will be made by delaying the slow pulse signal in relation to the fast pulse signal until the second occurrence of the fast pulse signal is aligned with the slow pulse signal.

A delay control means is connected to the race delay measurement means to receive the measurement of the period of the external system clock. The delay control means will create a first phase control pulse and a second phase control pulse that will determine a duty cycle of the internal clock. A duty cycle synchronizer means ic, connected to the delay control means to create the internal clock from the first phase control pulse and the second phase control pulse. The duty cycle synchronizer will combine the first phase control pulse and the second phase control pulse to create two phases of the internal clock signal.

An internal buffer will buffer and amplify the two phase of the internal clock signal. The internal clock signal will have a delay time that is the second delay and will insure that the internal clock signal is aligned with the external clock signal to have minimum skew.

BRIEF DESCRIPTION OF THE DRAWINGS

FIG. 1a is a schematic diagram of a clock distribution circuit of an SDRAM of the prior art FIG. 1b is timing diagram showing the effects of the clock skew of the clock distribution circuit of the prior art.

FIG. 2a is a schematic diagram of a clock synchronous delay circuit of the prior art.

FIG. 2b is a timing diagram of a clock synchronous delay circuit of the prior art.

DETAILED DESCRIPTION OF THE INVENTION

Figure 3:
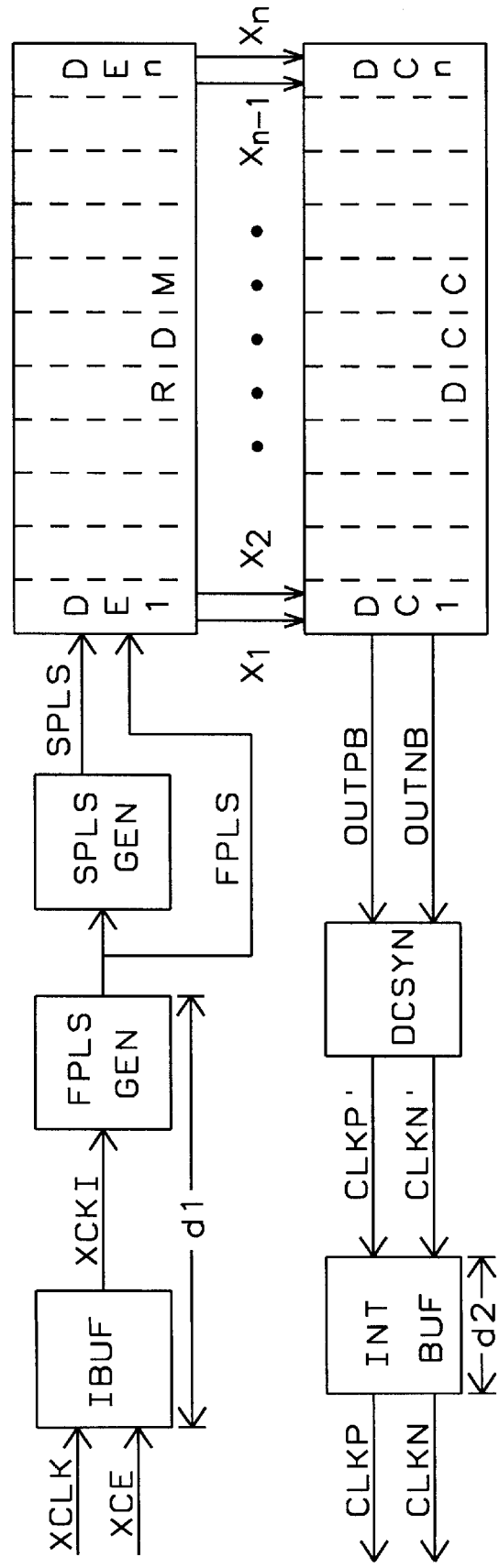
FIG. 3 is block diagram of a synchronous race delay timing circuit of this invention.

Refer now to FIG. 3 to understand the synchronous race delay timing circuit of this invention. The external system clock signal XCLK is received by the input buffer circuit IBUF. The clock enable signal XCE will control the transfer of the external system clock signal XCLK to the output signal XCKI of the input buffer IBUF.

The output signal XCKI of the input buffer IBUF will be the input of the fast pulse generator FPLS GEN. The fast pulse generator FPLS GEN is an edge triggered pulse generator that will create a narrow pulse signal when the output signal XCKI of the input buffer IBUF changes from a first logic level (0) to a second logic level (1). Ar edge triggered pulse generator is well known in the art. The input buffer IBUF and the fast pulse generator FPLS GEN will have an accumulated delay time that is designated d1.

Figure 6:
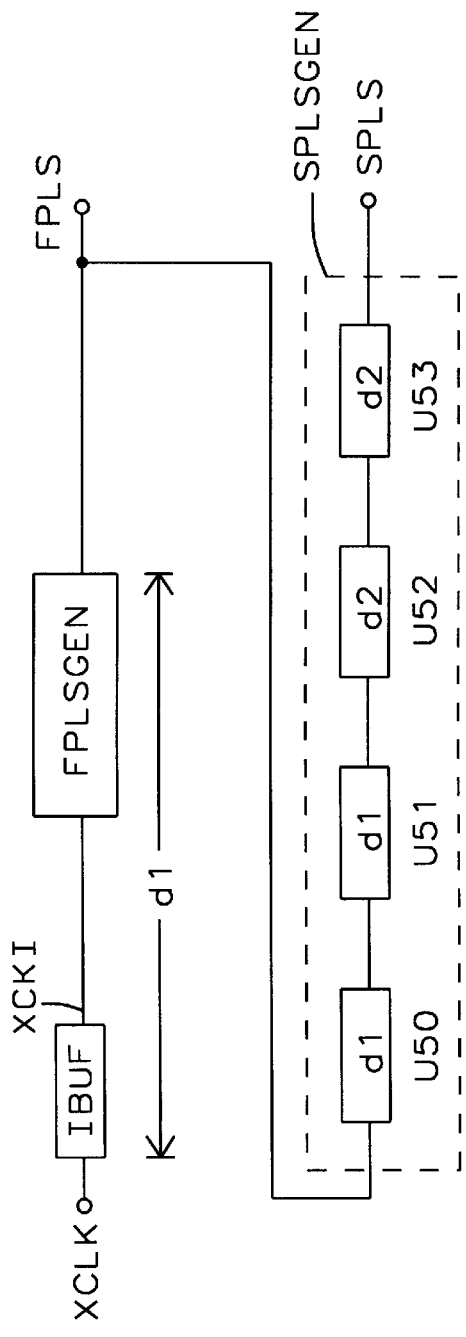
FIG. 6 is a schematic diagram of a first embodiment of an input buffer, a fast pulse generator, and slow pulse generator of a synchronous race delay timing circuit of this invention.

The output of the fast pulse generator FPLS GEN will be the fast pulse signal FPLS. The fast pulse signal FPLS will be the input of the slow pulse generator SPLS GEN. Refer now to FIG. 6 for a first embodiment of the slow pulse generator SPLS GEN The slow pulse generator SPLS GEN is comprised four serially connected delay blocks u50, u51 u52, and u53. The delay blocks u50, and u51 have a delay time that is approximately equal to the delay time dl of the internal buffer IBUF and the fast pulse generator FPLS GEN. The delay blocks u52, and u53 have a delay time that is approximately equal to the delay time d2 of the internal buffer INTBUF of FIG. 3. The slow pulse signal SPLS is the output of the slow pulse generator and is identical to the fast pulse signal FPLS except delayed by a factor of $$2(d1+d2).$$

Referring back to FIG. 3, the fast pulse signal FPLS and the slow pulse signal SPLS are the inputs to the race delay measurement circuit RDM. The race delay measurement circuit RDM is composed of multiple serially connected delay elements. Each delay element has two delay paths a fast delay path and a slow delay path. The fast delay signal FPLS is attached to the fast delay path and the slow delay signal SPLS is attached to the slow delay path. Typically the fast delay path will have incremental delays that are approximately one half the incremental delay of the slow delay path. This structure will have the effect of allowing the fast pulse signal FPLS to have a greater velocity through the delay measurement circuit than the slow pulse signal SPLS.

The race delay measurement circuit RDM has multiple outputs $X_1, \ldots, X_n$. One of the multiple outputs $X_1, \ldots, X_n$ will become active when a second pulse of the fast pulse signal FPLS has overtaken and is aligned with the first pulse of the slow pulse signal SPLS. This will provide an indication of the period $\tau_{ck}$ of the external clocking signal XCK less the delay d1 of the input buffer IBUF plus the delay of the slow pulse generator (2d1+2d2).

Figure 4:
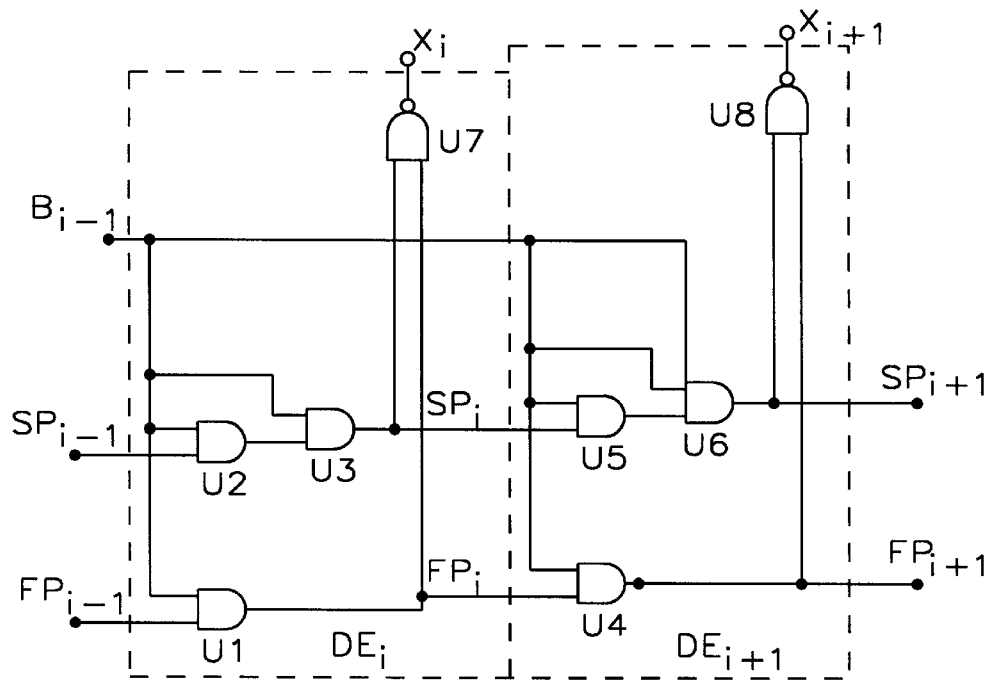
FIG. 4 is a schematic diagram of a delay element of a race delay measurement circuit of a synchronous race delay timing circuit of this invention.

Refer now to FIG. 4 for an embodiment of a delay element of the race delay measurement circuit RDM. A fast pulse signal $Fp_{i-1}$ is the first input to the AND gate u1 of the delay element $DE_1$. The slow pulse signal $Sp_{i-1}$, will be the first input to the AND gate u2 The output of the AND gate u2 will be the first input to the AND gate u3. The time delay of the AND gates u1, u2, and u3 will be approximately equal. This will allow the slow pulse to be delayed by a factor that is twice that of the fast pulse or equivalently the fast pulse signal $Fp_{i-1}$ will transit the delay element at twice the velocity of the slow pulse signal $Sp_{i-1}$.

The output $Fp_i$ of the AND gate u1 and the output $Sp_i$ of the AND gate u3 are the inputs to the AND invert (NAND) gate u7. When the slow pulse signal $Sp_i$ and the fast pulse signal $Fp_i$ have aligned and simultaneously transition from the first logic level (0) to the second logic level (1), the output $X_i$ of the NAND gate u7 will transition from the second logic level (1) to the first logic level (0).

A second delay element $DE_{i+1}$ will be composed of the AND gates u4, u5, and u6 and the NAND gate u8. The slow pulse output of the AND gate u3 will be the first input of the AND gate u5 and the fast pulse output of the AND gate u1 will be the first input of the AND gate u4. The output of the AND gate u5 will be the first input of the AND gate u6. As described above, the time delay of the AND gates u4, u5, and u6 are approximately equal thus making the velocity of the fast pulse signal $Fp_{i+1}$ through the second section of the delay element twice that of the slow pulse $Sp_{i+1}$.

The output of the AND gate u1 is the fast pulse signal $Fp_i$ to the next delay element in the race delay measurement circuit. The output of the AND gate u3 is the slow pulse $Sp_i$ to the next delay element $DE_{i+1}$ in the race delay measurement circuit.

The outputs of the AND gates u4 and u6 are the inputs to the NAND gate u8. As with the NAND gate u7, if the output $Fp_{i+1}$ of the fast pulse signal from the AND gate u4 is aligned with the slow pulse signal $Sp_{i+1}$ of the AND gate u6, the output $X_{i+1}$ of the NAND gate u8 will transition from the second logic level (1) to the first logic level (0).

The second inputs of the AND gates u1, u2, u3, u4, u5, and u6 are connected to a disable signal $B_{i-1}$. The disable signal $B_{i-1}$ will transition from the second logic level (1) to the first logic level (0) when the fast pulse signal and the slow pulse signal have aligned in the previous delay element. The disable signal $B_{i-1}$ will block the transmission of the slow pulse $Sp_{i-1}$ and fast pulse signal $Fp_{i-1}$ through the delay element.

Returning now to FIG. 3, the outputs $X_1, X_2, \ldots, X_{n-1}$, $X_n$ of the race delay measurement circuit RDM are the inputs to each of the multiple delay control elements DC1, ..., Dcn of the delay control circuit DCC. The delay control circuit DCC will generate two outputs OUTPB and OUTNB. The output OUTPB will be a delayed form of the output c)f the race delay measurement circuit RDM by a factor that is equal to the delay of the race delay measurement circuit RDM. The second output OUTNB will have a delay from the selected output $X_1, X_2, \ldots, X_{n-1}, X_n$ of the race delay measurement circuit RDM equivalent to one half of the delay of the output OUTPB, that is $$\tau OUTPB = \tau_{ck} - 2(d1 + d2)$$

$$\tau OUTNB = \frac{\tau_{ck} - 2(d1 + d2)}{2}$$

where $\tau_{OUTNB}$ is the time delay of the output signal OUTNB from the input signal $X_0, \ldots, X_n$ due to alignment position.

$\tau_{OUTPB}$ is the time delay of the output signal OUTPB from the input signal $X_0, \ldots, X_n$.

Figure 5:
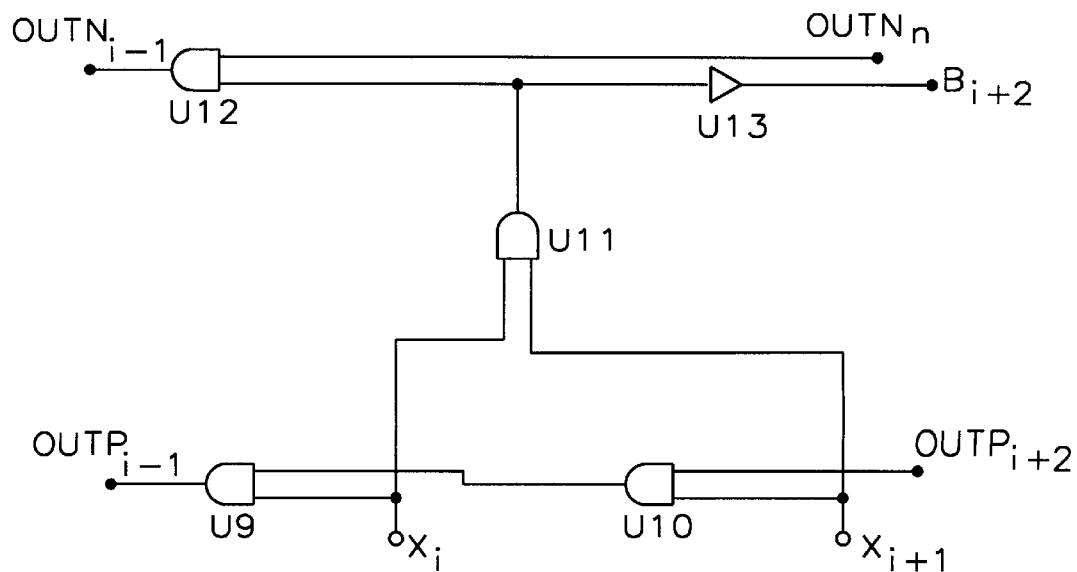
FIG. 5 is a schematic diagram of a delay control element of a synchronous race delay timing circuit of this invention.

Refer now to FIG. 5 for an embodiment of a delay control element. The inputs $X_{i-1}$, and $X_i$ are connect respectively to the first inputs of the AND gates u9 and u10. When one of the inputs $X_{i-1}$, and $X_i$ indicates that the slow pulse signal and the fast pulse signal have aligned, the AND gates u9 and u10 will transmit the pulse present on the inputs $X_{i-1}$ and $X_i$. This signal will be the output signal $OUTP_{i-1}$ which forms the delay path to create the output signal OUTPB of the delay control circuit DCC of FIG. 4.

The output of the AND gate u11 is connected to the first input of the AND gate u12 and travel through of the following delay control element to form the path that creates the output signal OUTNB of the delay control circuit DCC of FIG. 3.

When the fast pulse signal and the slow pulse signal have aligned and the output of the AND gate u11 has transitioned from the second logic level (1) to the first logic level (0), the gate u13 will transfer this signal as the disable signal $B_n$ thus inhibiting any subsequent delay control circuits from transferring the fast pulse signal $OUTN_{i+2}$ and slow pulse signal $OUTP_{i+2}$.

Figure 8:
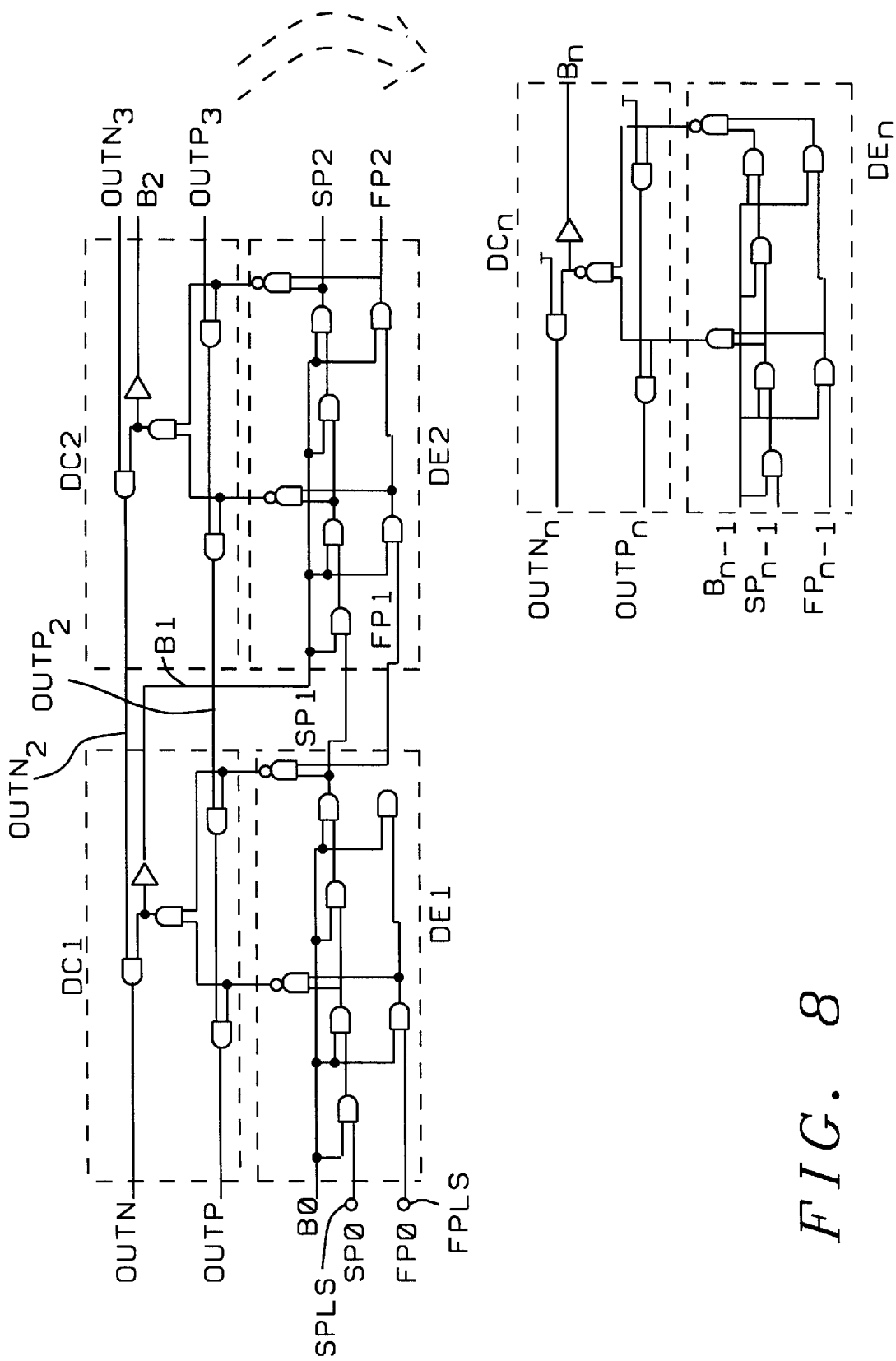
FIG. 8 is a schematic drawing of serially connected delay elements of the measurement control circuit and serially connected multiple delay control elements of delay control circuit of a synchronous race delay timing circuit of this invention.

FIG. 8 illustrates the detailed connectivity of the race delay measurement circuit RDM and the delay control circuit DCC of FIG. 3. The slow pulse signal SPLS and the fast pulse signal FPLS are the inputs to the first delay element DE1. The disable signal of the first delay element DE1 will be connected to the second logic level (1) to prevent the first delay element DE1 from being disabled.

The slow pulse output FP1 and the fast pulse input SP1 will been delayed as described above and will be the inputs to the second delay element DE2. the slow pulse output SP2 and the fast pulse output FP2 will be the inputs to the next subsequent delay element DE2 of the serially connected delay elements DE1, DE2, . . . , Den.

The outputs $X_1$ and $X_2$ of the delay element DE1 will be connected to the delay control element DC1. Likewise, the outputs $X_3$ and $X_4$ of delay element DE2, and the outputs $X_{n-1}$ and $X_n$ of delay element DEn will be respectively connected to the inputs of the delay control DC2 and Dcn.

Since the velocity of propagation of the fast pulse signal FPLS through the serially connected delay elements DE1, DE2, . . . , DEn is greater than the velocity of propagation of the slow pulse signal SPLS, the second pulse of the fast pulse signal FPLS will eventually align with the slow pulse signal SPLS and the output $X_1, X_2, \ldots, X_{n-1}$ and $X_n$ of the delay elements DE1, DE2, . . . , DEn where this occurs will transition from the second logic level (1) to the first logic level (0).

The outputs $OUTN_n$ and $OUTP_n$ of the delay control element DCn will be the inputs of the previous delay control element DCn-1. The outputs of the delay control element DC1 are the signals OUTPB and OUTNB.

When the fast pulse signal FPLS and the slow pulse signal SPLS have aligned, the appropriate output $X_1, X_2, \ldots, X_{n-1}$ and $X_n$ will form a pulse that transitions from the second logic level (1) to the first logic level (0) and returns to the second logic level (1) as above described. This pulse will be divided into two paths to form the outputs $OUTN_x$ and $OUTP_x$ where X=1,2, . . . , n of each delay control element. The delay of the path that forms the output $OUTN_x$ will be one half the delay of the output $OUTP_x$. This path will ultimately form the output OUTNB that is delayed from the active signal $X_n$ by a factor of $$\frac{\tau_{ck} - 2(d1 + d2)}{2}.$$

The delay path that forms the output $OUTP_x$ will ultimately form the output OUTPB that is delayed from the active signal $X_n$ by a factor of $\tau_{ck}-2(d1+d2)$.

Returning again to FIG. 3, the outputs OUTPB and OUTNB of the delay control circuit DCC will be the inputs to the duty cycle synthesizer DC SYN. The duty cycle synthesizer DC SYN will combine the input signals OUTPB and OUTNB to form the two clock signals CLKP' and CLKN' that have a phase difference of 180°. The clock signals CLKP' and CLKN' are the inputs to the internal buffer circuit INTBUF. The internal buffer circuit INTBUF will provide necessary amplification buffering of the clock signal CLKP' and CLKN' to be able to drive the internal circuits of the integrated circuit such as the SDRAM. Further the output signals CLKP and CLKN of the internal buffer circuit INTBUF will be delayed from the input signals CLKP' and CLKN' by the delay factor d2. This will insure that the clock signals CLKP and CLKN will be synchronized with the external system clock XCLK, and this synchronization happens within the first two cycles of the external clock XCLK from the enabling of the external clock XCLK.

Figure 7:
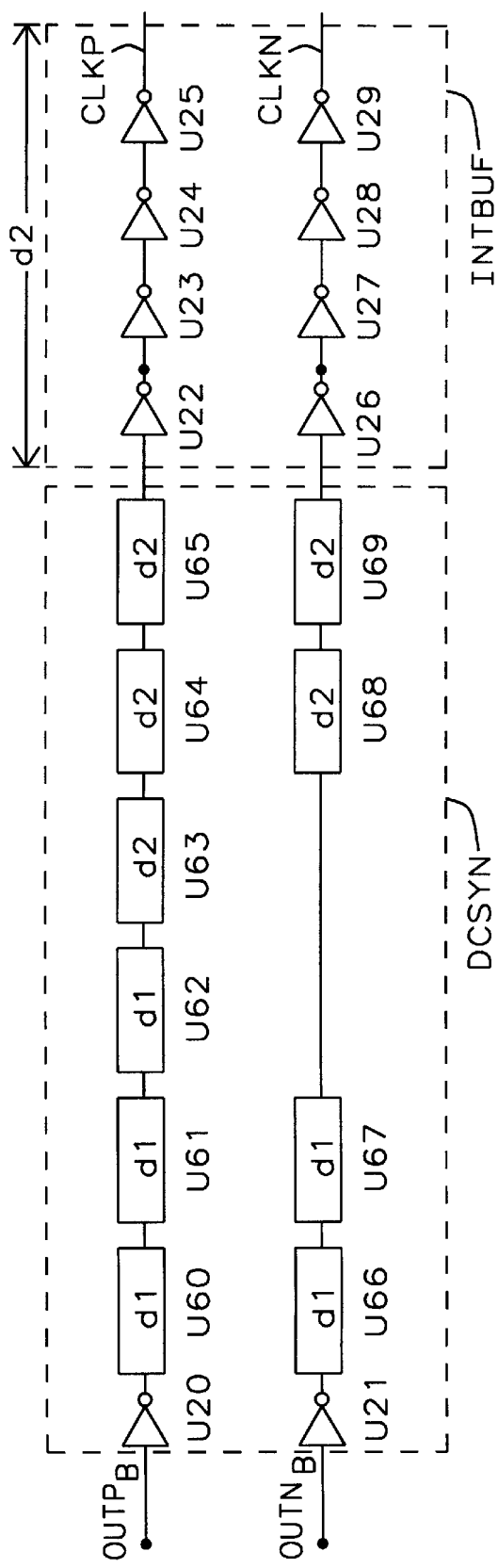
FIG. 7 is a schematic diagram of a first embodiment of a duty cycle synchronizer circuit and an internal buffer circuit of a synchronous race delay timing circuit of this invention.

Refer now to FIG. 7 for a more detailed explanation of the structure and operation of a first embodiment of the duty cycle synthesizer DCSYN and the internal buffer INTBUF. The outputs OUTPB and OUTNB of the delay control circuit DCC are respectively the inputs to the inverters u20 and u21. The inverted form of the signals OUTPB is delayed in delay blocks u60, u61, u62, u63, u64, and u65 by a factor of 3(d1+d2). The inverted form the signal OUTNB is delayed in delay blocks u66, u67, u68, and u69 by a factor of 2(d1+d2). These delays will insure that the signal OUTPB and OUTNB will be timed so as to form a 180° phase shift of the output clock signals CLKP and CLKN.

The chain of inverters u22, u23, u24, and u25 will buffer and amplify the output signal of the duty cycle synthesizer DC SYN to form the final positive internal clock CLKP that is in phase and aligned with the external clock XCLK of FIG. 3. The chain of inverters u26, u27, u28, and u29 will buffer and amplify the output signal of the duty cycle synthesizer DC SYN to form the final negative internal clock CLKN that is 180° out of phase with the external system clock XCLK. The delays of the two chains of inverters u22, u23, u24, and u25 and u26, u27, u28, and u29 will be designed to have a total delay equal to the delay factor d2.

Figure 9:
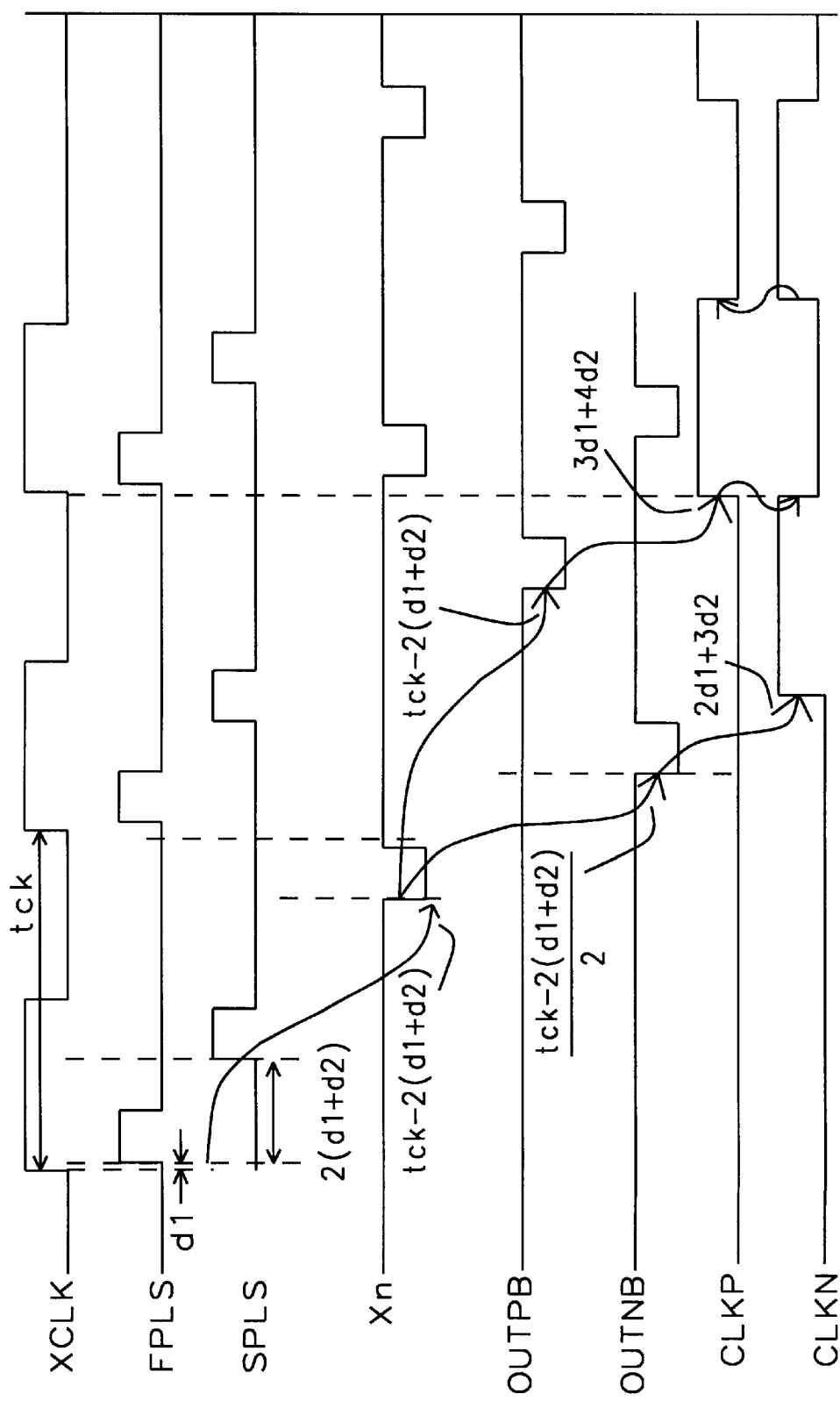
FIG. 9 is a timing diagram of a synchronous race delay timing circuit of this invention.

FIG. 9 illustrates that timings necessary to eliminate the skew between an external system clock XCLK of FIG. 1 and the deskewed internal clock DSCLK of FIG. 1. The external system clock XCLK will have a period of $\tau_{ck}$ that is the time form the rising edge of the first pulse to the rising edge of the second pulse, and between the rising edges of each successive pulse of the external system clock XCLK. The external system clock XCLK will be received and delayed by a delay factor dl and shaped to form the fast pulse signal FPLS, which in turn will be delayed by a factor of 2(d1+d2) to form the slow pulse signal SPLS. The delay factor d2 is the delay of the internal buffer that will drive the deskewed internal clock DSCLK of FIG. 1 to the internal circuits of the integrated circuit chip.

The fast pulse signal FPLS will be transferred to a delay chain having a high velocity of propagation and the slow pulse signal SPLS will be transferred to a delay chain having a low velocity of propagation. The differences in the velocities of propagation will allow the second pulse of the fast pulse signal FPLS to "catch up" with the slow pulse signal SPLS. When the fast pulse signal FPLS has "caught up" with the slow pulse signal SPLS, a measured delay signal $X_n$ will be generated that is delayed from the rising edge of the fast pulse signal FPLS by a delay factor of $\tau ck-2(d1+d2)$.

From the measured delay signal $X_n$, a first phase control pulse OUTPB and a second phase control pulse OUTNB will be generated. a second phase control pulse OUTNB will be delayed from the measured delay signal $X_n$ by a factor of $$\frac{\tau_{ck} - 2(d1 + d2)}{2}.$$

The first phase control pulse OUTPB will be delayed from the measured delay signal $X_n$ by a delay factor cf $\tau_{ck}-2(d1+d2)$.

The second phase control pulse OUTNB will lead the middle point of the rising edge of the external system clock XCLK by a time of:

$2d1+3d2$.

The first phase control pulse OUTPB will lead the middle point of the rising edge of the external system clock XCLK by a time of:

$3d1+4d2$

The positive clock CLKP and the negative clock CLKN will now be aligned with the external system clock XCLK and will remain aligned for all successive pulses of the external system clock XCLK. Further the duty cycle of the positive clock CLKP and the negative clock CLKN will be fixed to 50% as described.

It will be apparent to those skilled in the art that the polarities of the signal levels may be reversed and the logic functions modified and still achieve results that are in keeping with the intent of this invention. Further the delay factors maybe modified such that other duty cycles may be achieved.

Figure 10:
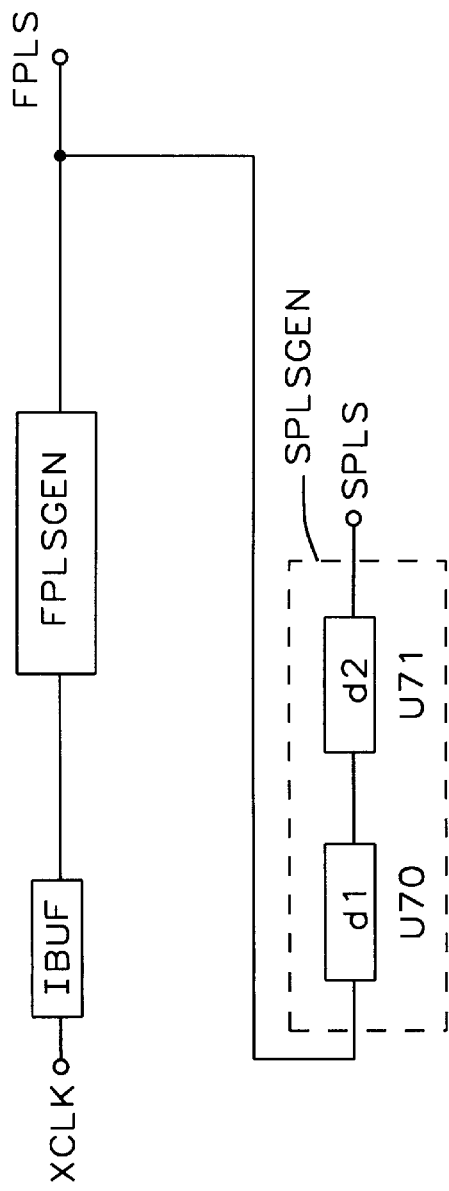
FIG. 10 is a schematic diagram of a second embodiment of an input buffer, a fast pulse generator, and slow pulse generator of a synchronous race delay timing circuit of this invention.
Figure 11:
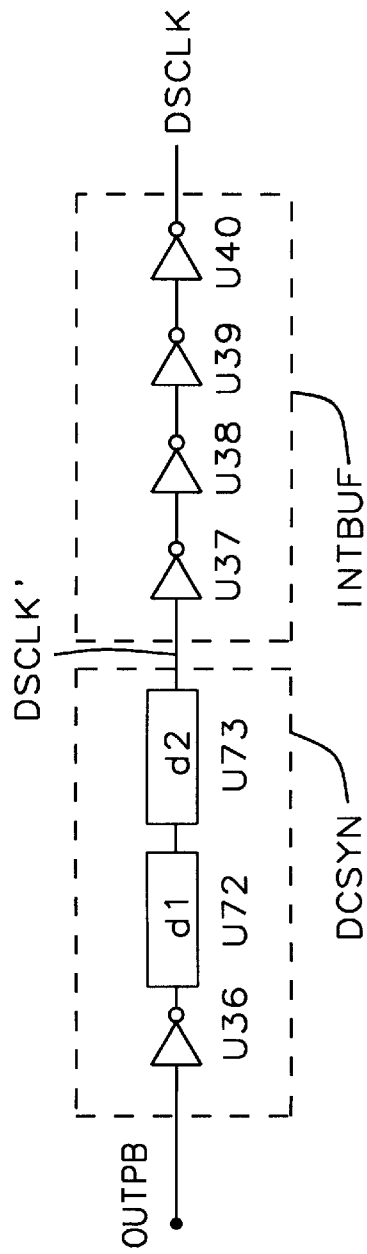
FIG. 11 is a schematic diagram of a second embodiment of a duty cycle synchronizer circuit and an internal buffer circuit of a synchronous race delay timing circuit of this invention.

The above described synchronous race delay circuit will provide the two phases of the deskewed clock to create the double frequency clock necessary to provide a double data rate for the SDRAM. Refer now to FIGS. 10 and 11 to understand the modifications to the circuitry necessary to derive a deskewed clock DSCLK for a single data rate for the SDRAM.

In FIG. 10 the slow pulse generator will delay the fast pulse signal FPLS by a factor of (d1+d2) in the delay blocks u70 and u71 to create the slow pulse signal SPLS. The is opposed to the delay factor of 2(d1+d2) of FIG. 7.

The duty cycle of the deskewed clock DSCLK shown in FIG. 11 is not controlled as the internal clock ICLK of FIG. 7 and therefore only the output signal OUTPB from the delay control circuit DCC of FIG. 3 is the input of the duty cycle synthesizer DC SYN. The input signal OUTPB will be received by the inverter u36 and delayed by a factor of (d1+d2) in delay blocks u72 and u73. The output DSCLK' of the duty cycle synthesizer DC SYN will be amplified and buffered by the inverter chain u37, u38, u39, and u40 to form the deskewed clock DSCLK. The delay of the inverter chain u37, u38, u39, and u40 will have a delay factor of d2 to make the deskewed clock DSCLK align with the external system clock XCLK of FIG. 3.

While this invention has been particularly shown and described with reference to the preferred embodiments thereof, it will be understood by those skilled in the art that various changes in form and details may be made without departing from the spirit and scope of the invention.

The invention claimed is:

1. A synchronous race delay circuit to provide multiple phases of an internal clock for an integrated circuit that is synchronized to an external system clock, such that said internal clock has minimal skew with said external system clock and the multiple phases are aligned, comprising
   a) an input buffer circuit to receive, buffer, and amplify said external system clock, whereby said input buffer has a first delay time;
   b) a fast pulse generator connected to the input buffer circuit to create a fast pulse signal that changes from a first logic level to a second logic level after the first delay time after said external system clock has changed from the first logic level to the second logic level, and changes from the second logic level to the first logic level at a pulse width time after changing from the first logic level to the second logic level;
   c) a slow pulse generator connected to the fast pulse generator to create a slow pulse signal that changes from the first logic level to the second logic level at a time that is the sum of the first delay time and a second delay time and changes from the second logic level to the first logic level at the pulse width time;
   d) a race delay measurement means connected to the fast pulse generator and the slow pulse generator to determine a measurement of a period of said external system clock by comparing a time difference between the slow pulse signal and a following fast pulse signal;
   e) a delay control means connected to the race delay measurement means to receive the measurement of the period of the external system clock and create triggering pulse;
   f) a duty cycle synchronizer means connected to the delay control means to create the multiple phases of the internal clock from the triggering pulses; and
   g) an internal buffer to buffer and amplify said multiple phases of the internal clock, having the second delay time to insure that the internal clock has minimum skew with said external system clock.

2. The synchronous race delay circuit of claim 1 wherein the race delay measurement means comprises:
   a) a plurality of delay elements whereby each delay element includes:
      a first double delay gate having a first slow pulse input, a first blocking input and a first slow pulse output, whereby said first double delay gate has a first delay increment from said first slow pulse input to said first slow pulse output,
      a second double delay gate having a second slow pulse input, a second blocking input and a second slow pulse output, whereby said second double delay gate has a second delay increment from said second slow pulse input to said second slow pulse output connected to the first slow pulse input of a subsequent delay element,
      a first single delay gate having a first fast pulse input, a third blocking input, and a first fast pulse output, whereby said first single delay gate has a third delay increment from the first fast pulse input to the first fast pulse output that is approximately one half that of the first delay increment,
      a second single delay gate having a second fast pulse input, a fourth blocking input, and a second fast pulse output, whereby said second single delay gate has a fourth delay increment from the second fast pulse input to the second fast pulse output that is approximately one half that of the first delay increment, a first delay checker having a first input connected to the first slow pulse output and a second input connected to the first fast pulse output, to provide a first checker output to the delay control means to indicate that a delayed version of the fast pulse signal and a delayed version of the slow pulse signal are aligned indicating the measurement of the period of the external system clock, and a second delay checker having a first input connected the second slow pulse output and a second input connected to the second fast pulse output, to provide a second checker output to the delay control means to indicate that a delayed version of the fast pulse signal and a delayed version of the slow pulse signal are aligned indicating the measurement of the period of the external system clock.

3. The synchronous race delay circuit of claim 2 wherein the delay control means comprises:

a) a plurality of serially connected control transfer gates, whereby each control transfer gate is connected to one of the plurality of delay elements and will create a positive control pulse and a negative control pulse when the measurement of the period of the external system clock is present at one of the delay elements, and will transfer said positive control pulse and said negative control pulse if the measurement of the period of the external system clock is present at a subsequent control transfer gate, and will be inoperative if the measurement of the period of the external system clock is present: at a previous control transfer gate; and b) a plurality of blocking gates wherein each blocking gate has an input connected to one of the control transfer gates and an output connected to the race delay measurement means, whereby said blocking gate will create a blocking signal when the measurement of the period of the external system clock is determined to disable a portion of said race delay measurement means.

4. A method to create a multiple phase internal clock for an integrated circuit having minimal clock skew from an external system clock, comprising the steps of:

a) receiving and buffering said external system clock;

b) generating a fast pulse signal that changes from a first logic level to a second logic level after a first delay time after said external system clock has changed from the first logic level to the second logic level, and changes from the second logic level to the first logic level at a pulse width time after changing from the first logic level to the second logic level;

c) generating a slow pulse signal from said fast pulse signal that changes from the first logic level to the second logic level a time that is the sum of the first delay time and a second delay time and changes from the second logic level to the first logic level at the pulse width time;

d) transferring said fast pulse signal to a first delay chain having a first propagation velocity;

e) transferring said slow pulse signal to a second delay chain having a second propagation velocity, whereby said first propagation velocity is greater than said second propagation velocity;

f) measuring an overtake point wherein a second occurrence of said fast pulse signal overtakes a first occurrence of said slow pulse signal within said first and second delay chains;

g) at said overtake point within said first and second delay chains creating a first phase and a second phase control pulse, whereby a time difference between said first and second phase control pulses determine a duty cycle of said internal clock;

h) combining said first phase control pulse and said second phase control pulse to form said multiple phase internal clock;

i) delaying the multiple phase internal clock so as to align with the external system clock; and j) buffering, amplifying, and transferring said multiple phase internal clock to circuitry within said integrated circuit.

* * * * *